United States Patent [19]

Barba et al.

[11] 4,018,873
[45] Apr. 19, 1977

[54] PROCESSES FOR THE PREPARATION OF CONCENTRATED NITRIC ACID

[75] Inventors: Diego Barba; Fabrizio Battistoni; Candido D'Agostini; Giorgio Macchi, all of Rome, Italy

[73] Assignee: Societa' Italiana Resine S.I.R. S.p.A., Milan, Italy

[22] Filed: Dec. 9, 1975

[21] Appl. No.: 639,194

[30] Foreign Application Priority Data

Dec. 20, 1974 Italy .................................. 30823/74

[52] U.S. Cl. ................................ 423/394; 423/392
[51] Int. Cl.² ........................................ C01B 21/40
[58] Field of Search .................. 423/392, 393, 394; 203/13

[56] References Cited

UNITED STATES PATENTS

| 3,634,031 | 1/1972 | Hellmer | 423/392 |
| 3,676,065 | 7/1972 | Oberste-Berghaus | 423/393 |
| 3,876,752 | 4/1975 | Wendel | 423/394 |

FOREIGN PATENTS OR APPLICATIONS

| 1,926,435 | 12/1969 | Germany | 423/394 |
| 15,450 | 3/1970 | Japan | 423/392 |
| 910,131 | 11/1962 | United Kingdom | |

*Primary Examiner*—G. O. Peters
*Attorney, Agent, or Firm*—Brumbaugh, Graves, Donohue & Raymond

[57] ABSTRACT

Nitric acid having a concentration of at least 98 wt.% is prepared by recovering in liquid state nitrogen peroxide from a gaseous flow containing the same, by absorption in nitric acid, heating of the resulting solution and liquefaction of the gaseous peroxide evolved, followed by a first chemical absorption of a fraction of the liquid peroxide with nitric acid at 70–80% and air and distillation of the resulting concentrated nitric acid. The gaseous products discharged from said first absorption and comprising unreacted peroxide and air are contacted with nitric acid and water in a second chemical absorption stage, thereby to produce the nitric acid used in the first absorption. The remaining fraction of liquid peroxide is delivered to the distillation column, discharged at the top thereof and recycled to the liquefaction stage, while nitric acid is extracted at the bottom of the distillation column and recycled to the second absorption stage.

7 Claims, 1 Drawing Figure

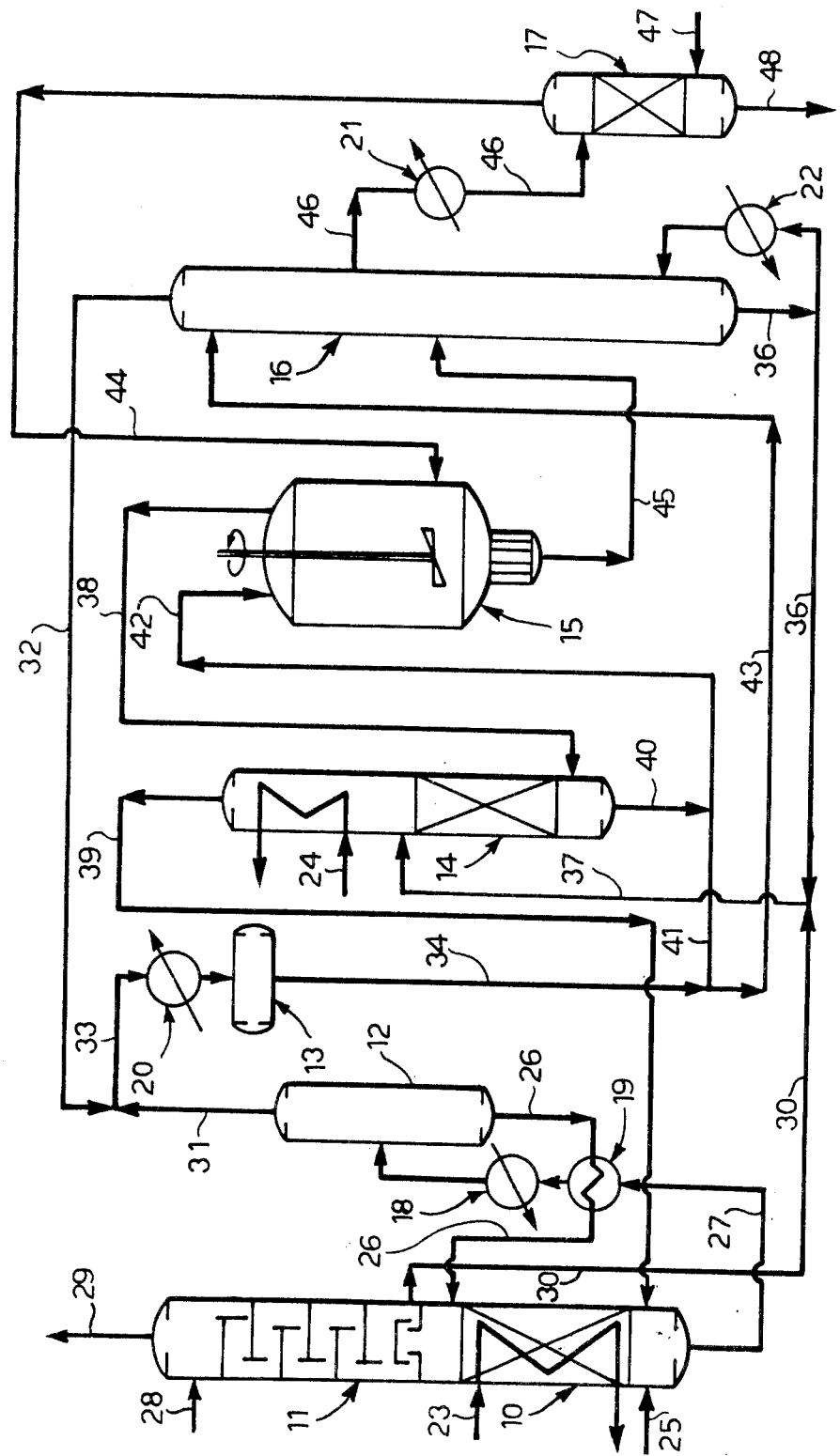

PROCESSES FOR THE PREPARATION OF CONCENTRATED NITRIC ACID

The present invention concerns an improved process for the preparation of nitric acid having a concentration of at least 98% by weight.

According to what is known in the art, it is possible to produce nitric acid with a high concentration (98% or more) by the action of a dehydrating agent on the aqueous solutions of nitric acid having an acid content in the order of 50–65% by weight.

The use of dehydrating agents, such as, for instance, sulfuric acid and magnesium nitrate, is consequential to the fact that the water-nitric acid mixtures present an azeotrope whose acid content is equal to about 69% by weight.

Furthermore the aqueous solutions with a content of nitric acid in the order of 56–65% by weight are produced by conventional processes wherein ammonia is catalytically oxidized with oxygen or gases containing oxygen, followed by absorption of the nitrogen oxides in water or in diluted nitric acid.

More particularly, according to said processes, the dehydrating agent is mixed with the aqueous solution of nitric acid and the resulting mixture is distilled to produce highly concentrated nitric acid. Since the dehydrating agent selectively absorbs the water, or combines with it, it is possible by heating to develop nitric acid vapors of a very high concentration. The residual aqueous solution is then recovered and separately distilled so as to eliminate the water and thus regenerate the dehydrating agent.

This procedure involves an alternated dilution and concentration of the dehydrating agent and the concentration operation requires a great expenditure of energy.

Moreover equipments of remarkable size and expense are required, because they must be built with corrosion resistant materials.

For these reasons the production of nitric acid of high concentration has been set up, in the technique, starting from the gaseous flow originated from the catalytica oxidation of ammonia by the so called direct process.

More particularly according to this process, first the catalytic oxidation of ammonia is performed by air at atmospheric or above atmospheric pressure, according to the following equation:

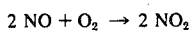

thus obtaining a gaseous flow which normally contains about 10% by volume of nitrogen oxide and about 17% by volume of water vapor.

Said gaseous flow is then submitted to treatments capable of separating the water contained therein and of transforming the nitrogen oxide into the corresponding peroxide.

For this purpose usually the gaseous flow is cooled until the water condenses and separates in the form of aqueous diluted solution of nitric acid, inasmuch as, besides the condensation, the formation of nitric acid occurs also, according to the equation:

Furthermore the transformation of the nitrogen oxide into the corresponding peroxide occurs by mean of the excess oxygen present in the mixture, according to the equation:

$$2\,NO + O_2 \rightarrow 2\,NO_2$$

The nitrogen peroxide actually is an equilibrium mixture of $NO_2$ and $N_2O_4$ which, in the present specification will henceforth be indicated simply as peroxide.

At the end of such treatments, a gaseous mixture, rich in peroxide and without, or substantially without, water and nitrogen oxide is obtained and said mixture is brought into contact with concentrated nitric acid for the purpose of physically absorbing the nitrogen peroxide contained therein. The solution is then heated, thus developing gaseous peroxide and finally the cooling of this last and its liquefaction is performed.

The liquid peroxide thus obtained is reacted in autoclave with oxygen and water (or with diluted nitric acid) according to the equation:

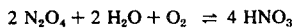

It is possible to obtain highly concentrated nitric acid (98% or more) in periods of time industrially useful, by the use of oxygen and the application of high pressures, generally above 50 atmospheres.

However, it is preferred to perform the chemical absorption of the peroxide until an acid having a concentration in the order of 80–90% by weight is produced and then to submit said acid to distillation. In this case it is possible to utilize air as oxidizing gas, according to the equation:

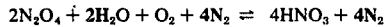

and to operate at pressures lower than 10 atmospheres.

The preparation of concentrated nitric acid by means of the direct process, presents several drawbacks especially in the distillation of the acid coming from the chemical absorption stage and in the recovery of the excess peroxide which does not react in said absorption stage.

The acid coming from the absorption contains, in effect, some unreacted peroxide which has to be separated and recycled.

For this purpose the acid can be submitted to stripping by air before the distillation.

According to another known technique, the products coming from the chemical absorption stage are submitted to distillation in a first column, with separation of acid at the bottom and of peroxide at the top. The bottom product is then fractioned in a second column in order to separate the concentrated acid (98% or more) at the top and the azeotropic acid at the bottom.

This procedure presents the drawbacks relative to the complexity of the required equipments.

According to the present invention nitric acid having a concentration of at least 98% by weight is produced without the aid of dehydrating agents, by a simple and economical process which eliminates the drawbacks of the prior art or, at least, substantially reduces them.

Thus, the invention provides a process for the preparation of nitric acid having a concentration of at least 38 wt.% from nitrogen peroxide obtained by catalytic oxidation of ammonia, separation of nitrogen oxide from the resulting gaseous flow and transformation of said nitrogen oxide into nitrogen peroxide, wherein said peroxide is chemically absorbed in nitric acid to produce superazeotropic acid and wherein said superazeotropic acid is distilled, characterized in that a. a gaseous flow containing said nitrogen peroxide, is brought into contact with nitric acid having a concentration of at least 80 wt.%, thus obtaining a solution of said peroxide in said acid; said solution is heated so as to remove gaseous peroxide and said gaseous peroxide is liquefied by cooling;

b. superazeotropic nitric acid and water or a weak aqueous solution of nitric acid are brought into contact in a first chemical absorption stage, with the gaseous products containing nitrogen peroxide and oxygen coming from a second chemical absorption stage, to produce nitric acid having a concentration of from 70 to 80 wt.%, according to the equations:

$$3NO_2 + H_2O \rightleftharpoons 2HNO_3 + NO$$

$$2NO + O_2 \rightleftharpoons 2NO_2$$

c. the liquid products discharged from stage (b) are brought into contact in said second chemical absorption stage, with air and with a fraction of said liquefied peroxide of stage (a) to produce superazeotropic nitric acid having a concentration up to 90 wt.%, according to the equation:

$$2N_2O_4 + 2H_2O + O_2 + 4N_2 \rightleftharpoons 4HNO_3 + 4N_2$$

d. the remaining fraction of said liquefied peroxide of stage (a) is delivered to a distillation column at a point near to the top, and said superazeotrope acid discharged from stage (c) is delivered to said distillation column at an intermediate point between the top and the bottom; a lateral flow of nitric acid having a concentration of at least 98 wt.% is extracted at an intermediate point between said point of introduction of liquefied peroxide and said point of introduction of superazeotropic acid, superazeotropic nitric acid is extracted from said distillation column and recycled to said absorption stage (b), while gaseous peroxide is discharged at the top and combined with said gaseous peroxide of stage (a) so as to liquefy it together with the latter.

According to the preferred embodiment of the process of the present invention, the gaseous flow issuing from the first chemical absorption (stage (b)) is scrubbed in stage (a) by means of the nitric acid having a concentration of at least 80% by weight, so as to absorb the residual nitrogen oxides present in said gaseous flow.

According to another preferred embodiment, the air fed to the second chemical absorption (stage (c)) is previously brought into contact with the lateral flow of nitric acid extracted from the distillation column of stage (d).

Nitrogen peroxide can be obtained by producing first of all nitrigen oxide from air and ammonia in the known way, on platinum-rhodium catalysts, carrying out the operation at 800°–900° C at atmospheric- or above atmospheric pressure. Preferably the gaseous flow conveyed to oxidation contains ammonia in amount ranging from 8 to 12% molar and in the oxidation, pressures ranging from 5 to 10 absolute atmospheres are maintained. The resulting gaseous flow, containing nitrogen oxide and water vapor is then conveyed in a series of equipments for the thermal recoveries and then submitted to treatments to condense the water contained therein and to transform the nitrogen oxide into the corresponding peroxide.

This operation can be carried out according to any one of the conventional methods. Thus, for example, it is possible to cool the gaseous flow till the water condenses and separates in the form of queous nitric acid with a 40% concentration by weight.

The nitrogen oxide is besides transformed into the corresponding peroxide by means of the excess oxygen contained in the gaseous flow, even if it is possible to add a further amount of oxygen, or gases containing molecular oxygen to said flow.

In any event, gases rich in peroxide, generally around 15% by weight, wherein negligible amounts of nitrogen oxide and water are present, are obtained at the end of said treatments and are treated according to the process of the present invention.

A preferred embodiment of the process of the invention

A preferred embodiment of the process of the invention will be now described with reference on the accompanying drawing.

In the following description the percentages and the ratios are intended by weight, unless otherwise specified.

Stage (a)

Separation and liquefaction of the peroxide

The gaseous flow containing the peroxide and having a temperature of about 40° C is fed at the bottom of column 10, by means of pipe 25. Nitric acid having a concentration of at least 80% and in general of the order of 98–99% is fed, by means of pipe 26, at the top of the column.

The column may be either packed or of the plate type and in any case, is supplied with an exchanger 23 for the temperature control.

The physical absorption of the nitrogen peroxide into the concentrated nitric acid occurs in column 10, carrying out the operation in countercurrent and under the following preferred conditions: temperature of from 0° to 25° C, pressure of from 5 to 10 absolute atmospheres, peroxide concentration in the solution discharged by means of pipe 27, of from 5 to 20%.

Operating under these conditions at the top of column 10 is discharged a gaseous flow whose nitrogen oxides content is in the order of 1–2.5%. Said oxides are recovered in column 11 (either packed or of the plate type), by contact in countercurrent with water feed by means of pipe 28. Instead of water, the weak acid obtained in the production of nitrogen peroxide, instance in the cooling of the gaseous flow obtained from ammonia oxidation, may be also used.

In column 11 the following reactions take place:

$$3 NO_2 + H_2O \rightleftharpoons 2 HNO_3 + NO$$

$$2 NO + O_2 \rightarrow 2 NO_2$$

In any case the amount of water, as such, or in the form of weak acid, introduced into column 11 is that required by the stoichiometric balance for the subsequent chemical absorption reactions of peroxide.

Column 11 operates preferably at a temperature of from 10° to 40° C and at a pressure of from 5 to 10 absolute atmospheres, and a gaseous flow, whose nitrogen oxide content is lower than 2,000 ppm is discharged by means of pipe 29. Said gaseous flow is submitted to conventional treatments capable of eliminating the nitrogen oxides, for instance, by means of reducing substances, and is then discharged.

The peroxide solution in nitric acid, discharged from column 10, is fed to container 12 by means of pipe 27, after heating with the recycled acid in exchanger 19 and then in exchanger 18.

The container 12 is preferably maintained at a temperature of from 50° to 100° C and at a pressure of from 5 to 10 absolute atmospheres and under such conditions, gaseous peroxide is evolved, while the residual acid has a peroxide content lower than 1%.

The acid is recycled to column 10, by means of pipe 26, after heat-exchange in 19.

The gaseous peroxide, withdrawn by means of pipe 31, is mixed with that coming from the distillation column 16 by means of pipe 32.

The resulting mixture is conveyed by means of pipe 33 in exchanger 20, maintained at about 40° C and the liquefied peroxide is collected in container 13.

Stage b

First chemical absorption

According to the present invention a first chemical absorption is performed by bringing into contact in countercurrent, aqueous nitric acid with the gaseous flow discharged from the second absorption stage.

More particularly, with reference to the drawing, the azeotropic nitric acid coming from the distillation column 16 by means of pipe 36 is mixed with the dilute solution of acid coming from the bottom of column 11 by means of pipe 30.

The resulting mixture is fed by means of pipe 37 to the top of column 14 (either packed or of the plate type), and made to flow in countercurrent with the gaseous flow coming from reactor 15 and fed at the bottom of the column by means of pipe 38.

Optimal results are obtained when the absorption is carried out at a temperature of from 30° to 70° C and at a pressure of from 5 to 10 absolute atmospheres, maintaining in the liquid feed an overall concentration of the acid ranging from 68 to 75% and a nitrogen oxides content the gaseous feed, ranging from 40 to 60% and a concentration of the acid ranging from 70 to 80% in the liquid flow discharged and a nitrogen oxides content ranging from 10 to 30%, in the gaseous flow discharged.

Therefore in column 14 a chemical absorption of the nitrogen peroxide is achieved, based on the following equations:

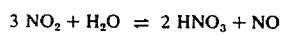

It is appropriate to supply the absorption column 14 with a reflux condenser 24.

In this way the gaseous flow issuing from the head of column 14 has generally a nitrogen oxides content in the order of 20%, a temperature of about 20° C and is conveniently fed to the bottom of column 10 by means of pipe 39. Thus the nitrogen oxides contained in said gaseous flow are almost completely recovered.

Stage c

Second chemical absorption

According to the present invention, the liquid peroxide discharged from reservoir 13 by means of pipe 34, is in part conveyed through pipe 41 and mixed with the liquid products discharged from the first chemical absorption through pipe 40.

The resulting mixture is fed to reactor 15 by means of pipe 42. Air is fed to said reactor by means of pipe 44.

Reactor 15 is a normal container supplied with stirrer.

In the second stage of chemical absorption, optimal conditions are achieved by operating at a temperature of from 30° to 70° C, at a pressure of from 5 to 10 absolute atmospheres, with a peroxide/nitric acid feed ratio ranging from 0.15:1 to 3:1 and with an excess of air ranging from 50 to 200% with respect to the stoichiometric amount required for the reaction.

Under these conditions, superazeotropic nitric acid with a concentration of up to 90% and in general in the order of 80–90% is produced according to the equation:

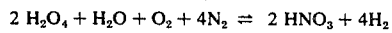

The gaseous flow issuing from reactor 15, is conveyed to the bottom of column 14 by means of pipe 38.

The liquid products of the reaction are discharged by means of pipe 45 are conveyed to the distillation, column 16.

Stage d

Distillation

According to the present invention, liquid nitrogen peroxide, discharged from reservoir 13, by means of pipe 34, is partially fed by means of pipe 43 to the top of distillation column 16.

The liquid products discharged from the second chemical absorption stage are fed by means of pipe 45 at an intermediate point between the top and the bottom of column 16.

Column 16 contains from 10 to 20 theoretical plates, the feed 43 occurs in correspondence of the first plate, and the feed 45 at a point located between the 5.th and the 10.th plate counting from the top.

In distillation, the optimal values of the pressure are of from 1.5 to 3 absolute atmospheres and those of the temperature are of from about 30°–40° C at the top, up to 130°–150° C at the bottom.

Furthermore, the ratio of the vapors issuing through pipe 32 at the top to the feed through pipe 43 is maintained from 1.5:1 to 3.5:1.

A lateral liquid flow (98% or more nitric acid) is extracted by means of pipe 46 at an intermediate point between the feed point through pipe 43 and the feed point through pipe 45 and preferably from 1 to 5 plates above the feed point through pipe 45.

This lateral flow is first cooled in exchanger 21 to about 60° C and then brought into contact in column 17 with air fed by means of pipe 47.

After this bleaching treatment, the acid at 98% or more is recovered by means of pipe 48.

The gaseous peroxide issuing at the top of column 16 is recycled by means of pipe 32 and then is liquefied.

The acid discharged at the bottom of column 16 is in part fed to column 14 by means of pipe 36, the remainder being recycled to column 16 after passage in the reboiler 22.

The process of the present invention offers first of all the advantage relative to the flexibility, in that it is possible to continue the production of nitric acid, having the peroxide in stockage, even with the upstream plant arrested. In effect the production cycle of peroxide is separated from that of production of acid.

Another advantage lies in the compactness of the plant, in that:

the separation of the peroxide, concentrated nitric acid and azeotropic nitric acid is achieved in a single column instead of two columns as in the known art;

the condensation of the peroxide coming from the physical absorption equipment and from the final distillation column is achieved in a single equipment;

the use of reflux condenser 24 avoids the necessity of an accumulator of condensate and of a pump, which, on the contrary, will be required by a normal surface equipment.

Finally a further advantage of the process of the present invention consists in the simplicity of the operations, since the separation of the absorbed peroxide is achieved in a simple flashing instead of a distillation and a stripping as in the known art.

In the following experimental Example the parts and the percentages are intended by weight, unless otherwise specified.

EXAMPLE

With reference to the drawing, a gaseous flow having the following composition: $N_2$ 79.2%, $O_2$ 1.7%, $NO_2 + N_2O_4$ 18.1% NO 0.2%, $H_2O$ 0.6%, $HNO_3$ 0.2%, is fed to column 10 by means of pipe 25 at a rate of 8,658 Kg/hr.

A gaseous flow having the following composition: $N_2$ 68.10%, $O_2$ 7.20%, $NO_2 + N_2O_4$ 24.50%, $H_2O$ 0.05%, $HNO_3$ 0.15%, is fed at a rate of 1,931 Kg/hr through pipe 39.

A liquid flow having the following composition: $N_2O_4$ 1.0%, $H_2O$ 1.8%, $HNO_3$ 97.2%, is fed by means of pipe 26 at the top of column 10, at a rate of 17,982 Kg/hr.

Column 10 is a packed column with an intermediate cooling, and is operated in countercurrent at a pressure of 7.5 atmospheres and at an average temperature of 5° C. A liquid flow having the following composition $N_2O_4$ 9.7%, $HNO_3$ 88.6%, $H_2O$ 1.7%, is discharged at the bottom by means of pipe 27, at a rate of 19,980 Kg/hr.

This flow pre-heated in exchanger 19 to a temperature of 100° C, is fed into container 12 from the top whereof peroxide, practically pure, is discharged and from the bottom whereof flow 26 is extracted.

Container 12 is a flash-drum maintained at a pressure of 2.5 absolute atmospheres.

A gaseous flow having the following composition: $N_2$ 95.5%, $O_2$ 3.0%, $NO_2+N_2O_4$ 1.0%, $H_2O+HNO_3$ 0.5%, and a flow rate of 8,591 kg/hr is discharged at the top of column 10.

This flow is scrubbed in equipment 11 by water introduced through pipe 28 at a rate of 310 kg/hr. Column 11 contains 8 riddled plates.

From the top (pipe 29) a gaseous flow having the following composition: $N_2$ 95.50%, $O_2$ 3.00%, $NO_2+N_2O_4$ 0.1%, NO 0.09%, $H_2O+HNO_3$ 1.31%, is discharged at a rate of 8,561 kg/hr and is conveyed to the final stripping of the nitrogen oxides.

A liquid having a flow rate of 340 kg/hr (flow 30) and the following composition: $HNO_3$ 27.5%, $H_2O$ 72.5%, is extracted from the bottom and conveyed to equipment 14.

The peroxide obtained at the composition: of equipment 12 is condensed in 20 and collected in 13, and then is conveyed by means of pipe 34, in part to reactor 15 (pipe 43) and in part to column 15 (pipe 41).

A liquid (flow 37) having a flow rate of 3,530 kg/hr and the following composition: $HNO_3$ 70.8%, $H_2O$ 29.2%, is fed to column 14.

Flow 38 having the following composition: $N_2$ 41.50%, $O_2$ 8.50%, $NO_2+N_2O_4$ 45.50%, $H_2O$ 1.70%, $HNO_3$ 2.90%, is fed at the bottom of column 14 at a rate of 3,163 kg/hr.

Flow 39 is obtained at the top, after cooling to 20° C in reflux condenser 24, and is conveyed at the bottom of column 10, while a liquid flow having a flow rate of 4,762 kg/hr and the following composition: $NO_2+N_2O_4$ 6.7%, $HNO_3$ 74.8%, $H_2O$ 18.5%, is extracted at the bottom (pipe 40) and said flow, joined to flow 41 constitutes the feed to reactor 15.

Therefore, said reactor is fed at a rate of 8,541 kg/hr with a liquid flow having the following composition: $NO_2 + N_2O_4$ 47.8%, $H_2O$ 10.4%, $HNO_3$ 41.8%.

Reactor 15 is a 5 cu.m container appropriately stirred, which is also fed at a rate of 1,755 kg/hr with a gaseous flow coming from bleaching tower 17, having the following composition: $N_2$ 74.9%, $O_2$ 22.7%, $H_2O+HNO_3$ 1.4%, $NO_2+N_2O_4$ 1.0%.

The reactor is maintained at 8 absolute atmospheres and at a temperature of 60° C. A gaseous effluent which constitutes flow 38 and a liquid effluent extracted at a rate of 7,133 kg/hr and having the following composition: $N_2O_4$ 24.8%, $HNO_3$ 63.9%, $H_2O$ 11.3%, which constitutes the feed to column 16, are withdrawn from the reactor.

Said column 16 has riddled plates and is fed through pipe 45 at the 20.th plate, and at the first plate (pipe 43), with 4,662 kg/hr of peroxide.

Furthermore in column 16 the operation is carried out at a pressure of 2.4 absolute atmospheres at the top, for a temperature of 40° C and a gaseous flow of practically pure peroxide is discharged at the top at a rate of 6,443 kg/hr.

A liquid flow of 2,162 kg/hr, having the following composition: $NO_2+H_2O_4$ 1.2%, $HNO_3$ 98.1%, $H_2O$ 0.7%, is extracted (pipe 46) at the 10.th plate and, after cooling in exchanger 21, is fed to bleaching tower 17, at the bottom whereof the specified acid produced is collected.

At the bottom of column 16, there is a temperature of 130° C and a liquid flow having the composition: $HNO_3$ 75.45%, $H_2O$ 24.55%, is extracted (pipe 36) at a rate of 3,190 kg/hr.

We claim:

1. A method for the preparation of nitric acid having a concentration of at least 98 wt.% from nitrogen peroxide obtained by catalytic oxidation of ammonia, separation of nitrogen oxide from the resulting gaseous flow and transformation of said nitrogen oxide into nitrogen peroxide, wherein said peroxide is chemically absorbed in nitric acid to produce superazeotropic acid and wherein said superazeotropic acid is distilled, which comprises:

a. bringing into contact a gaseous flow containing said nitrogen peroxide with nitric acid having a concentration of at least 80 wt.%, thus obtaining a solution of said peroxide in said acid; heating said solution so as to remove gaseous peroxide and liquefying said gaseous peroxide by cooling;

b. bringing into contact superazeotropic nitric acid and water or a weak aqueous solution of nitric acid in a first chemical absorption stage to provide an overall nitric acid concentration of 68 to 75%, with the gaseous products containing nitrogen peroxide and oxygen coming from a second chemical absorption stage, to produce nitric acid having an increased concentration of from 70 to 80 wt.%, according to the equations:

$$3 NO_2 + H_2O \rightleftarrows 2 HNO_3 + NO$$

$$2 NO + O_2 \rightleftarrows 2 NO_2$$

c. bringing into contact the liquid products discharged from stage (b) in said second chemical absorption stage, with air and with a fraction of said liquefied peroxide of stage (a) to produce superazeotropic nitric acid having a concentration up to 90 wt.%, according to the equation:

$$2 N_2O_4 + 2 H_2) + O_2 + 4 N_2 \rightleftarrows 4 HNO_3 + 4 N_2$$

d. delivering the remaining fraction of said liquefied peroxide of stage (a) to a distillation column at a point near to the top, and delivering said superazeotropic acid discharged from stage (c) to said distillation column at an intermediate point between the top and the bottom; extracting a lateral flow of nitric acid having a concentration of at least 98 wt.% at an intermediate point between said point of introduction of liquefied peroxide and said point of introduction of superazeotropic acid, extracting superazeotropic nitric acid from said distillation column and recycling the latter to said absorption stage (b), while discharging gaseous peroxide at the top and combining the latter with said gaseous peroxide of stage (a) so as to liquefy it together with the latter.

2. The method of claim 1, wherein the gaseous flow issuing from stage (b) and containing unreacted nitrogen peroxide is also brought into contact with said nitric acid of stage (a), thereby to absorb said unreacted peroxide in said solution of (a).

3. The method of claim 1, wherein said air to be used in stage (c) is previously brought into contact with said lateral flow of nitric acid extracted from the distillation column of stage (d).

4. The method of claim 1, wherein in stage (a) said gaseous flow is contacted with nitric acid having a concentration of 98–99 wt.%, carrying out the operation at a temperature of from 0° to 25° C and at a pressure of from 5 to 10 atmospheres, and discharging a solution containing from 5 to 20 wt.% of peroxide.

5. The method of claim 1, wherein said first chemical absorption stage (b) is carried out at a temperature of from 30° to 70° C and at a pressure of from 5 to 10 atmospheres, maintaining in the liquid feed an overall concentration in nitric acid of from 68 to 75 wt.% and in the gaseous products fed in a nitrogen oxides content of from 40 to 60 wt.% and discharging a gaseous flow with a nitrogen oxides content of from 10 to 30 wt.%.

6. The method of claim 1, wherein said second chemical absorption stage is carried out at a temperature of from 30° to 70° C and at a pressure of from 5 to 10 atmospheres, with a weight ratio of peroxide to nitric acid in the feed of from 0.15:1 to 3:1 and with an excess of air of from 50 to 200% with respect to the stoichiometric amount required by the reaction, discharging nitric acid with a concentration of from 80 to 90 wt.%.

7. The method of claim 1, wherein said distillation column of (d) has from 10 to 20 theoretical plates and operates at a pressure of from 1.5 to 3 atmospheres, at a temperature at the top of 30°–40° C and at the bottom of 130°–150° C, introducing said liquid peroxide at the level of the first plate from the top, and said superazeotropic acid at a level from the 5.th to the 10.th plate from the top, extracting said lateral flow from 1 to 5 plates above the introduction point of said azeotropic acid, and maintaining a weight ratio between the gaseous flow discharged at the top and the liquid flow of said superazeotropic acid fed in of from 1.5:1 to 3.5:1.

* * * * *

UNITED STATES PATENT AND TRADEMARK OFFICE
CERTIFICATE OF CORRECTION

PATENT NO. : 4,018,873
DATED : April 19, 1977
INVENTOR(S) : Diego Barba et al.

It is certified that error appears in the above-identified patent and that said Letters Patent are hereby corrected as shown below:

Col. 1, line 45, "catalytica" should be --catalytic--;
Col. 3, line 45, "the preferred" should be --a preferred--;
Col. 3, line 58, "nitrigen" should be --nitrogen--;
Col. 4, delete lines 18 and 19; (they appear twice)
Col. 4, line 21, "on" should be --to--;
Col. 4, line 51, "feed" should be --fed--;
Col. 4, line 53, before "instance" insert --for--;
Col. 5, line 47, after "content" insert --in--;
Col. 6, line 30, "are conveyed" should be --and conveyed--;
Col. 7, line 35, after "18.1%" insert a comma;
Col. 7, line 65, after "$NO_2+$" delete "$\lambda$";
Col. 8, line 5, "composition:" should be --top--;
Col. 8, line 13, "45.50%" should be --45.40%--;
Col. 9, line 26, that portion of the equation reading "$H_2$)" should be --$H_2O$--;
Col. 9, lines 30-31, "superazoëtropic" should be --superazeotropic--.

Signed and Sealed this nineteenth Day of July 1977

[SEAL]

Attest:

RUTH C. MASON
*Attesting Officer*

C. MARSHALL DANN
*Commissioner of Patents and Trademarks*